Aug. 10, 1926.  
S. F. JACKES  
OVEN  
Filed Dec. 26, 1925    3 Sheets-Sheet 1

1,595,662

Stanley F. Jackes,
Inventor,
Delos G. Haynes,
Attorney

Aug. 10, 1926.
S. F. JACKES
1,595,662
OVEN
Filed Dec. 26, 1925
3 Sheets-Sheet 2
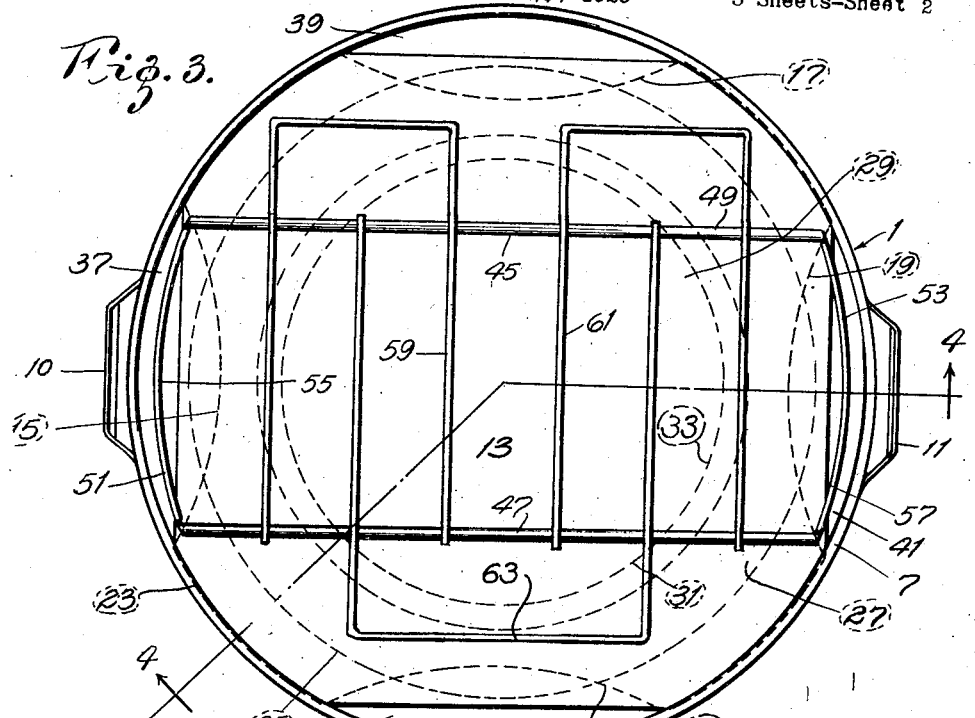
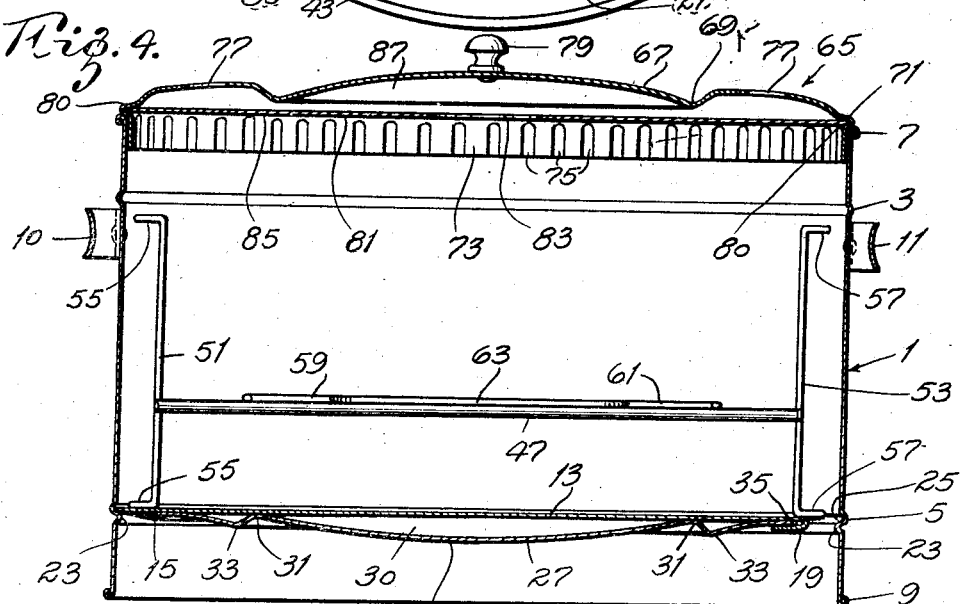
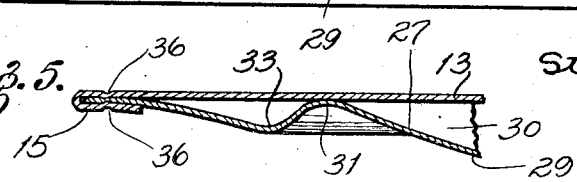

Aug. 10, 1926.
S. F. JACKES
1,595,662
OVEN
Filed Dec. 26, 1925
3 Sheets-Sheet 3
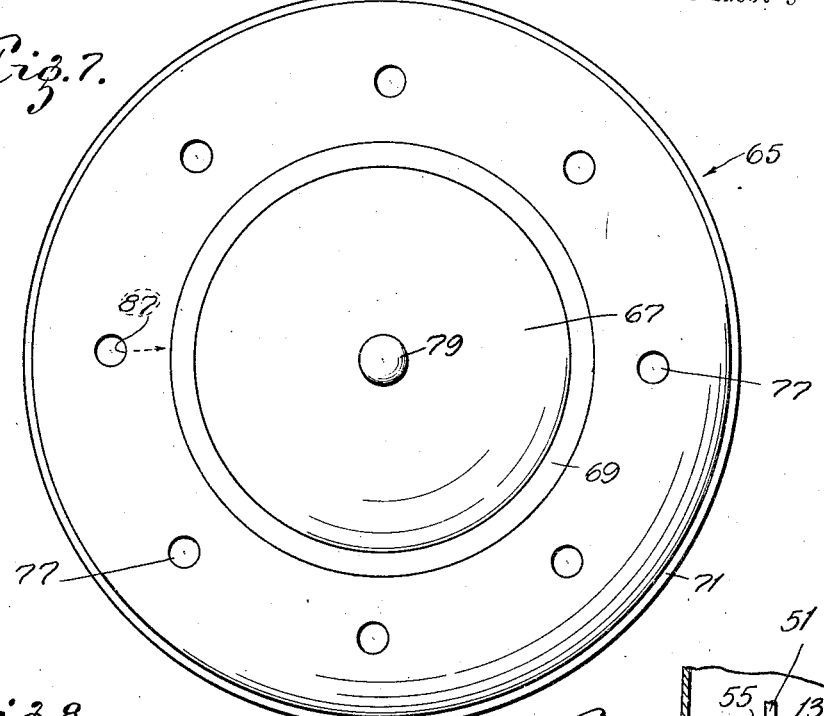
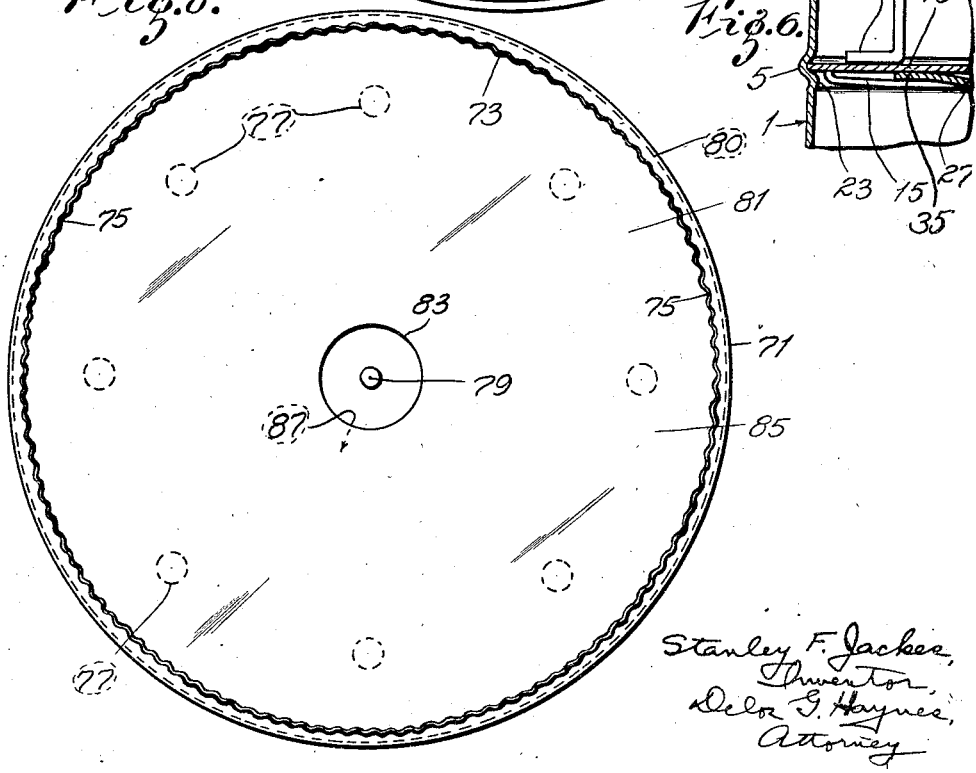
Stanley F. Jackes,
Inventor
Deloz G. Haynes,
Attorney Patented Aug. 10, 1926.

1,595,662

UNITED STATES PATENT OFFICE.

STANLEY F. JACKES, OF ST. LOUIS, MISSOURI, ASSIGNOR TO JACKES-EVANS MANUFACTURING COMPANY, OF ST. LOUIS, MISSOURI, A CORPORATION OF MISSOURI.

OVEN.

Application filed December 26, 1925. Serial No. 77,858.

This invention relates to portable cooking or baking ovens and with regard to certain more specific features to an improved body for portable ovens and an improved lid therefor.

Among the several objects of the invention may be noted the provision of a baking or cooking oven having a removable double bottom; one which has a lid adapted to conserve heat and yet improve a baked or cooked product coming therefrom; and one which is economically yet ruggedly built. Other objects will be in part obvious and in part pointed out hereinafter.

The invention accordingly comprises the features of construction, combinations of elements and arrangements of parts which are exemplified in the structure hereinafter described and the scope of the application of which will be indicated in the following claims.

In the accompanying drawings, in which is shown one of the various possible embodiments of this invention, Fig. 1 is a plan view of the oven with the lid or cover removed;

Fig. 3 is a view similar to Fig. 1 showing an inverted rack in the oven;

Fig. 4 is a view similar to Fig. 2 and shows the inverted rack;

Fig. 5 is an enlarged sectional detail of a turned under edge of a double bottom;

Fig. 6 is an enlarged sectional detail showing the juncture between the bottom and side walls;

Fig. 7 is a top plan view of the cover;

and

Figure 1:
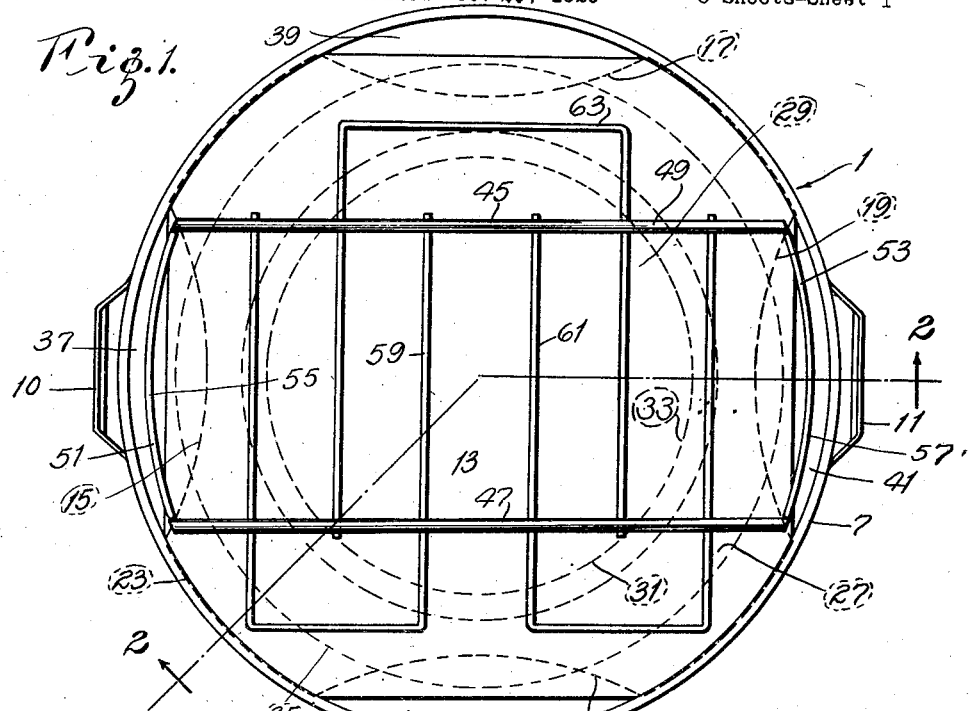

Fig. 8 is a bottom view of the cover.

Similar reference characters indicate corresponding parts throughout the several views of the drawings.

Figure 2:
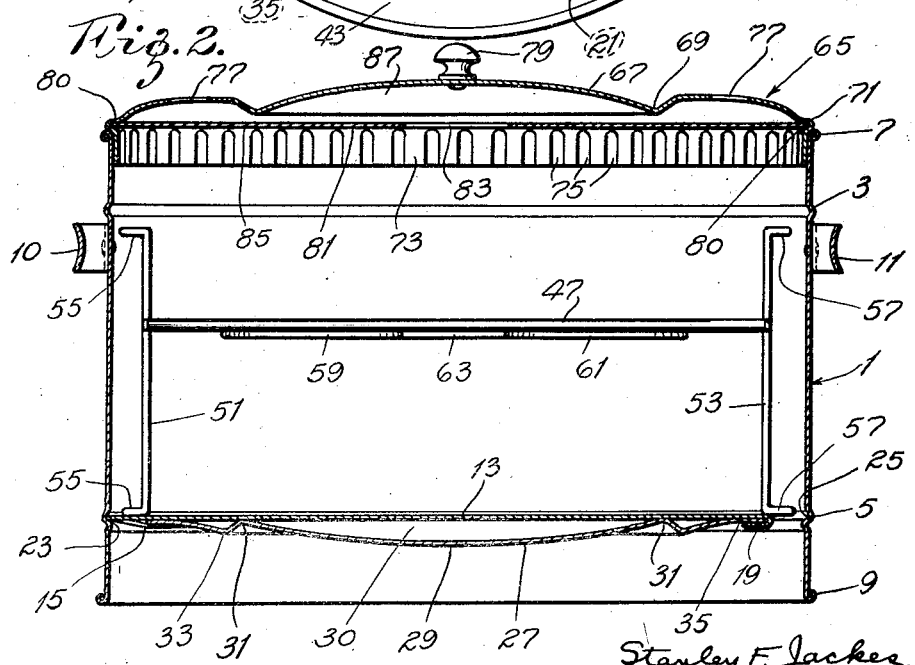
Fig. 2 is an ideal section taken vertically on line 2—2 of Fig. 1 and shows a cover applied.

Referring now more particularly to Figs. 1 and 2 there is illustrated at 1 a preferably light gage, sheet metal cylinder, beaded circularly in girth at an upper level 3 and also at a lower level 5.

The upper bead 3 is rolled outwardly and the lower bead 5 is rolled outwardly and inwardly. Both beads serve stiffening purposes. The lower one 5 has other functions to be described.

The cylinder 1 is also provided with outwardly formed stiffening rolls or flanges 7 and 9 at its upper and lower ends respectively. The beads 3 and 5 and rolls 7 and 9 are all integrally formed with the cylinder. The cylinder is preferably provided with a blue-steel finish to prevent corrosion and to enhance its appearance.

Oppositely or otherwise fastened to said cylinder 1, are handles or grips 10 and 11 for purposes of lifting and transporting the oven.

The bottom of the oven comprises a substantially circular and flat sheet 13 which has had four oppositely and equally spaced segments removed from the original plane thereof. At the places of removal of said segments, the material which comprises the segment, has been turned in under the remainder of the sheet 13 to form clips 15, 17, 19 and 21.

Hence, the sheet 13 is adapted to be stamped substantially circularly and then to have the said under turning operation for the clips performed upon it.

The diameter of the blank of the bottom sheet 13 is slightly greater than that of the inside of the cylinder 1. Hence by forcibly pushing the preformed sheet downwardly into cylinder 1, said sheet is adapted to rest upon the lower inwardly formed portion 23 of the crimp 5 in the cylinder. The fit between the bottom piece 13 and the cylinder 1 is a snug one, that is, the piece 13 is sprung into the cylinder. As the outwardly turned upper portion 25 of the crimp 5 is reached, the bottom sheet 13 springs or snaps outwardly into a more or less flat position. It is somewhat permanently held in the outwardly and upwardly formed portion 25 of the crimp until a positive upward force is applied to remove it. Its own weight will not cause spontaneous falling out of the said bottom piece 13, should the cylinder be overturned. However, the bottom may be removed manually for purposes such as cleaning. The portion 23 positively prevents downward movement of the bottom.

One of the purposes of the turned down clips 15, 17, 19 and 21 is to hold up against the said bottom piece 13, a sub-bottom 27. This sub-bottom 27 is formed with a downwardly extending dome 29 whose circular rim 31 touches the bottom 13. Outside of the rim 13 of the dome 29 is formed a ridge 33 and outside of the ridge the edge 35 of the sub-bottom 27 rests against the bottom 13.

The under turned clips 15, 17, 19 and 21 embrace the edge 35 to hold the sub-bottom 27 up against the bottom 13. As indicated in Fig. 5, after the clips are turned down to embrace the edge 35 of the sub-bottom 27, said clips are tightly punched to the bottom 27. The punch marks are indicated by numeral 36. Upon slipping the bottom 13 and its appended sub-bottom piece 27 down into the cylinder 1 to a seat on the inward lower portion 23 and in the outward upper portion of the bead 5, there are left four open segmental spaces 37, 39, 41 and 43 between the strips 15, 17, 19 and 21 respectively, and the cylinder wall. These spaces, combined with the inverted dome shape of the sub-bottom 27, serve to circulate warm air into the cylinder. Between the sheet 13 and the sub-bottom 27 is attained an air chamber or pocket 30 which prevents burning of material in the oven under normal conditions.

The material and finish of the bottom 13 and sub-bottom 27 are preferably the same as the material and finish which comprise the said cylinder 1.

The sub-bottom has no motion relative to the bottom 13, in so far as its edges are held as described.

For purposes of holding contents within the oven there is provided a wire rack 45. The rack 45 comprises seven lengths of wire.

Two lengths of wire comprise horizontal side rails 47 and 49. These rails are welded or otherwise fastened to loop-shaped end frames 51 and 53. The pairs of cross pieces 55 and 57 of the frames 51 and 53 respectively are bowed endwardly.

The radius of the arc on which the bows 55 and 57 are formed is slightly less than the radius of the cylinder 1 and the length of the rack parts are such as to permit dropping the rack into the oven without excessive room for play between the rack and cylinder.

The bows 55 and 57 subtend a greater angle on their radius circle than the edges of the openings 37, 39, 41 and 43 subtend on their radius circle, so that the pairs of legs 51 and 53 can not fall through the said openings in any position of the rack. The last named result may be accomplished in other ways.

Under the side rails 47 and 49 are welded or otherwise fastened, three U-shaped wire lengths 59, 61 and 63. Two of the U-shaped lengths 59 and 61 are shaped alike and are set out to one side when their legs are fastened to the side rails.

The other U-shaped length 63 is of wider construction and extends out to the other side of the rails when its legs are fastened thereto. The legs of the U-shape 63 fall within the interior of the said U-shapes 59 and 61, preferably centrally thereof.

Hence a grid is formed which is adapted to cover efficiently, the interior horizontal projected area of the oven. Referring to Figs. 1 and 2 it is evident that the rails 47, 49 and the U-shaped pieces form a shelf-like grid for holding material in the oven and that said grid is held up from the bottom of the oven by means of the frames 51 and 53. The members 55 and 57 form pairs of curved handles for lifting the rack 45 out from the oven.

Now, should it be desired to place the articles within the oven down closer to the oven bottom, it would only be necessary to remove the rack 45 from its position shown in Figs. 1 and 2, invert the rack and replace it, as illustrated in Figs. 3 and 4. This inversion causes the horizontal portion of the rack 45 to be positioned nearer the bottom 13 in so far as said portion was heretofore positioned above the center of the frames 51 and 53.

Hence the materials or objects to be placed within the oven, may be set at a lower level and in closer proximity to the hot bottom by this inversion.

It can be seen that by means of this inverting rack, articles may be placed at advantageous points within the oven. Some articles may require slow heating at lower temperatures while others require fast heating at higher temperatures.

A high position of the grids fulfills the former condition while a low position fulfills the latter.

The purpose of the four openings 37, 39, 41 and 43 is to give a good lateral distribution of heat throughout the oven instead of having the heat concentrated at such a point as the fire happens to be beneath.

The inverted dome shape of the sub-bottom 27 obviously aids the distribution of heat by conducting it to the openings. The sub-bottom also protects the bottom 13 from the intense radiant heat of the fire and thereby prevents localization of heat in the oven. Consequently the possibility of burning objects within this oven is materially reduced.

In order to improvedly cook and bake materials placed within the cylinder 1 an improved lid 65 is provided therefor (see Figs. 2, 4, 7 and 8). This lid comprises a sheet metal dome 67 provided with a downwardly shaped ridge 69 for strengthening purposes. The circular edge 71 of the dome 67 is adapted to over reach the said upper roll 7 of the cylinder 1 and to be itself rolled inwardly and then downwardly. The inward rolling provides a lip for resting the cover on the roll 7 and the downward formation results in a vertical cylindrical flange 73 adapted to slidably fit the cylinder 1. The lid is thereby guided into and lightly held to the cylinder 1. It should be noted that as the outer edge of the blank which forms the dome 67 is bent to form the flange 73, that crimping ridges 75 are automatically formed. These ridges serve to aid in stiffening the structure.

A plurality of holes 77 are formed in the dome 67, preferably outside of the ridge 69. A heat insulating knob 79 is placed centrally of the dome 67 for lifting the lid as a whole.

The edge or lip 71, beside serving as a rest, serves to embrace the edge 80 of a horizontal reflecting baffle or diaphragm 81. The baffle is preferably made of sheet metal (aluminum or tinned steel) and is provided with a more or less centrally located circulating hole or vent 83. The lower surface 85 of the baffle 81 is provided with a reflecting finish for reflecting heat downwardly.

It should be noted that the preferable criterion for the relative placement of the holes 77 and the hole 83 is that they shall be disaligned, whereby a tortuous passage is provided for heated air rising from the cylinder 1 into and through the cover 65. The present form is further preferred, however, in that the central location of the hole 83 provides a tortuous passage of hot air from the openings 37, 39, 41 and 43 through the cylinder 1. By means of the arrangement described, circuitous circulation of hot air through the oven is caused and no short circuit directly through is permitted. The circulation itself improves the manner in which the contained food is cooked or baked, while the circuitous arrangement delays the air in the oven whereby heat is conserved and better heat distribution is attained. The result is an evenly cooked or baked food product. The hollow chamber 30 of the bottom aids in obtaining the last-named result.

The bright lower heat reflecting surface 85 of the baffle 81 serves to deflect heat waves downwardly on materials within the oven thereby browning them. This is a highly desirable result and improves the cooked or baked product. The reflection of heat as described also conserves heat which would otherwise be convected through the sheet 81 to be lost in outward radiation. Furthermore, any outward radiation that may take place from the top of the sheet 81 is reduced because of the thermal insulating effect of the warm air pocket 87 between the dome 67 and the sheet 81. The air in said pocket circulates more or less slowly due to the circuitousness of its path. It may be noted that the said circuitous path is increased by the ridge 69 in the dome 67.

In view of the above, it is believed that the various features of this invention will be clear without further elaboration, and it will be seen that with the apparatus herein described, the several objects of the invention are achieved and other advantageous results obtained.

As many changes could be made in carrying out the above construction without departing from the scope of the invention, it is intended that all matter contained in the above description or shown in the accompanying drawings shall be interpreted as illustrative and not in a limiting sense.

I claim:

1. An oven comprising a cylinder, a girth crimp in the cylinder, a double bottom adapted to rest in said crimp and sideward openings left by the configuration of said bottom; a cover comprising a dome, an integral outer lip formed therearound and an integral flange extending from the lip, said flange removably telescoping the upper end of the cylinder and the lip resting on the upper edge of said cylinder, a diaphragm held by the said lip and disaligned openings in the dome and the diaphragm.

2. An oven comprising a cylinder, a girth crimp in the cylinder, a double bottom adapted to rest in said crimp and sideward openings left by the configuration of said bottom; a cover comprising a dome, an outer lip formed therearound and a flange extending from the lip, said flange removably telescoping the upper end of the cylinder and the lip resting on the upper edge of said cylinder, a diaphragm held by the said lip and disaligned openings in the dome and the diaphragm.

3. An oven comprising a cylinder, a girth crimp in the cylinder, a double bottom adapted to rest in said crimp and sideward openings left by the configuration of said bottom; a cover comprising a dome, an outer lip formed therearound and a flange extending from the lip, said flange removably telescoping the upper end of the cylinder and the lip resting on the upper edge of said cylinder, a diaphragm held by the said lip and disaligned openings in the dome and the diaphragm, the diaphragm having a reflecting finish on the lower surface thereof.

4. A oven comprising a cylinder, a double bottom for said cylinder, and sideward openings between the bottom and the cylinder, a cover comprising a dome adapted to removably cooperate with the upper edge of the cylinder, a diaphragm formed across the cylinder beneath said dome having a reflecting finish on the lower surface, and disaligned openings in the dome and diaphragm, the diaphragm openings being disaligned with said openings in said bottom.

In testimony whereof, I have signed my name to this specification this 24th day of December, 1925.

STANLEY F. JACKES.